US 6,551,056 B2

(12) United States Patent
Rau

(10) Patent No.: US 6,551,056 B2
(45) Date of Patent: Apr. 22, 2003

(54) COOLING AIR DUCTING SYSTEM IN THE HIGH PRESSURE TURBINE SECTION OF A GAS TURBINE ENGINE

(75) Inventor: Guido Dr. Rau, Munich (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/741,847

(22) Filed: Dec. 22, 2000

(65) Prior Publication Data

US 2001/0011452 A1 Aug. 9, 2001

(30) Foreign Application Priority Data

Dec. 22, 1999 (DE) .......................................... 199 62 244

(51) Int. Cl.[7] ................................................. F01D 9/06
(52) U.S. Cl. ....................................... 415/115; 415/144
(58) Field of Search ................................. 415/144, 115, 415/174.2

(56) References Cited

U.S. PATENT DOCUMENTS

| 3,420,502 A | | 1/1969 | Howald |
| 3,628,880 A | | 12/1971 | Smuland |
| 3,635,586 A | * | 1/1972 | Kent et al. ................ 416/97 R |
| 4,291,531 A | | 9/1981 | Campbell |
| 5,522,698 A | * | 6/1996 | Butler et al. ............. 415/170.1 |
| 5,800,125 A | * | 9/1998 | Largillier et al. ......... 416/96 R |
| 5,984,630 A | * | 11/1999 | Di Salle et al. ......... 415/174.5 |
| 6,183,193 B1 | * | 2/2001 | Glasspoole et al. ......... 415/115 |

FOREIGN PATENT DOCUMENTS

| DE | 2913548 | 10/1979 |
| DE | 4422965 | 1/1996 |
| EP | 0690202 | 1/1996 |
| EP | 0757750 | 8/1998 |

* cited by examiner

Primary Examiner—Edward K. Look
Assistant Examiner—Ninh Nguyen
(74) Attorney, Agent, or Firm—The Law Offices of Timothy J. Klima

(57) ABSTRACT

This invention relates to a cooling air ducting system in the high-pressure turbine section of a gas turbine engine, in which a portion of the air flow which exits from the compressor section of the engine and bypasses the combustion chamber of the gas turbine is ducted via a first pre-swirl system provided in a diaphragm into a pre-swirl chamber arranged upstream of the first stage turbine rotor disk and is fed from this pre-swirl chamber, in particular, to the air-cooled blades of this rotor disk for cooling purposes, and in which another portion of this air flow is applied to the face of the first stage turbine rotor disk via a second air transfer system which, when viewed in the radial direction, is arranged further inward than the first pre-swirl system. According to this invention, the second air transfer system is again provided as a pre-swirl system connecting to the pre-swirl chamber. Preferably, a sealing system is provided between a section of the diaphragm which confines the pre-swirl chamber and the turbine shaft section adjacent to this diaphragm section, this sealing system being less permissive of leak air than the labyrinth-type seals commonly used in this application.

5 Claims, 1 Drawing Sheet

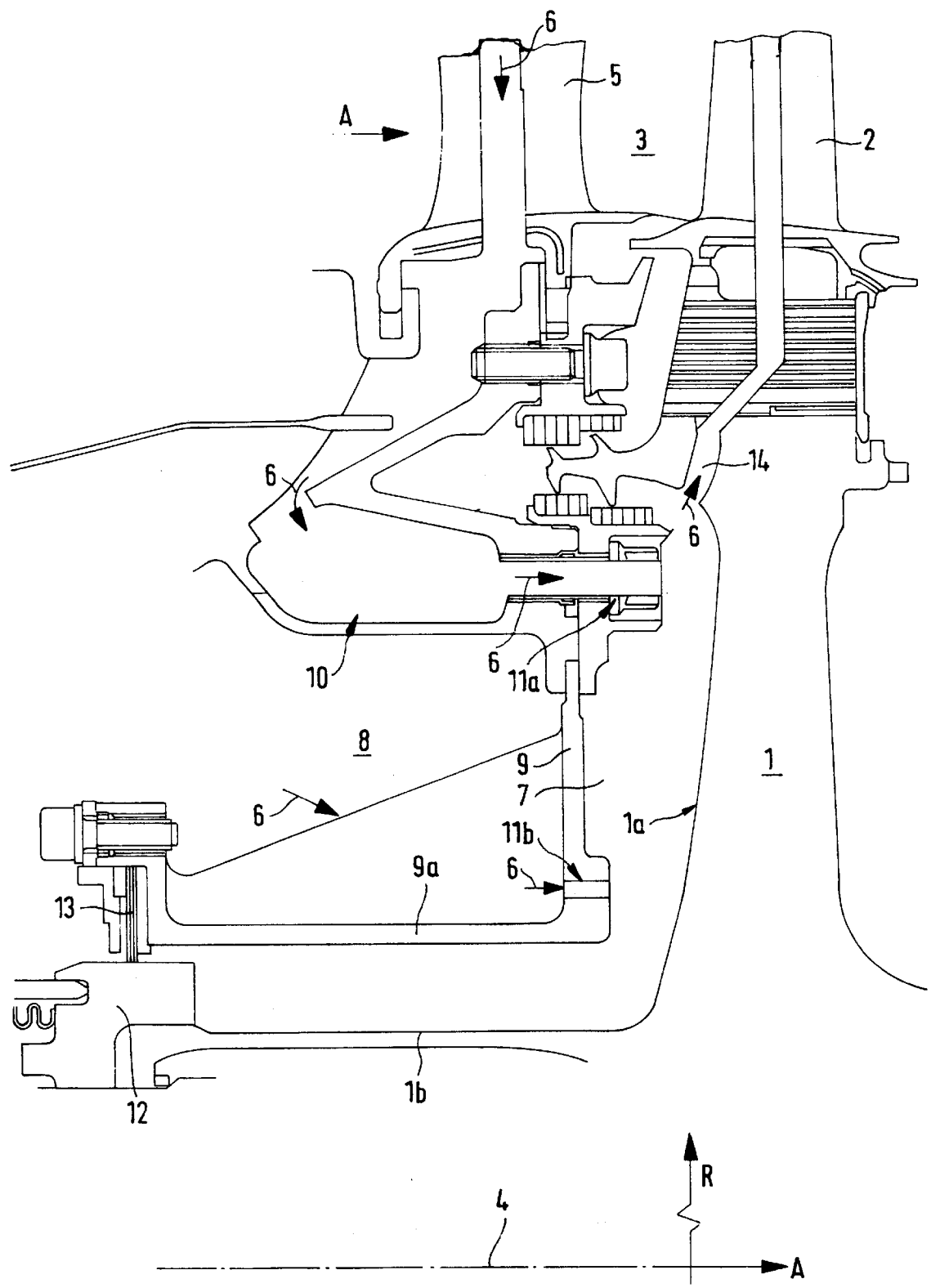

COOLING AIR DUCTING SYSTEM IN THE HIGH PRESSURE TURBINE SECTION OF A GAS TURBINE ENGINE

This application claims priority from the German Application No. 19962244.2 filed Dec. 22, 1999, which application is incorporated herein by reference.

BACKGROUND OF THE INVENTION

This invention relates to a cooling air ducting system in the high-pressure turbine section of a gas turbine engine, in which a portion of the air flow which exits from the compressor section of the engine and bypasses the combustion chamber of the gas turbine is ducted via a first pre-swirl system provided in a diaphragm into a pre-swirl chamber arranged upstream of the first stage turbine rotor disk and is fed from this pre-swirl chamber, in particular, to the air-cooled blades of this rotor disk for cooling purposes, and in which another portion of this air flow is applied to the face of the first stage turbine rotor disk via a second air transfer system which, when viewed in the radial direction, is arranged further inward than the first pre-swirl system. For background art, reference is made to Specification EP 0 757 750 B1 and DE 29 13 548 C2, in particular.

Cooling air ducting systems in accordance with the generic part of claim 1 are known in a great variety of designs. In these designs, an arrangement termed pre-swirl system —for example in the form of a suitable vane cascade or in the form of holes in said diaphragm whose axes extend partly in the circumferential direction relative to the engine rotational axis—is used to impart a swirl on the air flow entering the pre-swirl chamber which is arranged downstream of said diaphragm and upstream of the first stage turbine rotor disk, said swirl being co-directional with the direction of rotation of the turbine rotor disk. This ensures that this cooling air flow or this air flow entering the pre-swirl chamber, respectively, takes a favorable route, relative to the surface of the rotating rotor disk, with the temperature of this cooling air flow being advantageously reduced and the cooling efficiency being further improved by the deflection of the air flow in the pre-swirl system.

Said pre-swirl system is, in most cases, arranged quite far on the outside in the radial direction (relative to the engine rotational axis), i.e. relatively close to the main gas path of the engine in which the hot working gas is carried. Thus, a sufficiently cold air flow is available for the cooling of the blades carried by this turbine rotor disk, this airflow not being excessively heated up previously on the rotor disk. In order to cool the area of the rotor disk which is located further inward in the radial direction, a portion of the air flow which is compressed in the compressor and which bypasses the combustion chamber of the gas turbine is applied to this further inward area, in which arrangement a second air transfer system is, or can be, provided for this portion of the air flow. In the state of the art according to Specification DE 29 13548 C2 mentioned secondly at the beginning, the air flow which is routed via the second air transfer system to the face of the first stage turbine rotor disk is essentially separate from the air flow ducted via the first pre-swirl system, i.e. in this known state of the art, the cooling air through the second air transfer system will not, or only minimally, enter said pre-swirl chamber.

The air supplied via the second air transfer system shows only a weak swirl, which already becomes apparent from the fact that it is relatively far on the inside with respect to the radial direction. This is one of the reasons for the relatively small cooling efficiency of this air flow which is directed to the rotor disk surface. In addition, the relatively small swirl factor (this is the quotient of the circumferential velocity of the air flow and the circumferential velocity of the rotor disk) which ensues from the weakness of the swirl results in a high relative total temperature of the rotor disk which, as is known to the expert, has a negative effect on the life of the rotor disk.

If the second, radially further inward air transfer system is provided in the form of a labyrinth-type seal, as frequently encountered in the state of the art, the air supplied via this system will be heated additionally by the frictional effects in the labyrinth seal. Altogether, the radially further inward area of the turbine disk will be cooled much less than its radially further outward area. As a result of this, an undesirably high temperature gradient can occur in the rotor disk in the radial direction.

A broad aspect of the present invention is to provide remedy to the above problematics.

It is a particular object of this invention to provide the second air transfer system as a pre-swirl system which also exits to the pre-swirl chamber. Preferably, a sealing system is provided between a section of the diaphragm confining the pre-swirl chamber and the turbine shaft section adjacent to this diaphragm section, this sealing system being less permissive of leaking air than the labyrinth-type seal arrangements commonly used in this application.

According to the present invention, the cooling air is ducted towards the rotor disk surface or towards the face of the first stage turbine rotor disk, respectively, both in the radially further outward and in a radially further inward area by way of separate pre-swirl systems. Accordingly, for the conveyance of cooling air, a second (secondary) pre-swirl system is provided besides the first pre-swirl system known in the state of the art. These two pre-swirl systems connect to the same pre-swirl chamber upstream of the rotor disk, this pre-swirl chamber being appropriately enlarged, i.e. extending radially further inward. This provides for an extremely effective and radially more uniform cooling of the rotor disk. This secondary pre-swirl system will also lead to a change of the swirl factor, as a result of which the relative total temperature of the rotor disk will be lowered and the radial temperature gradients in the rotor disk generally be reduced considerably.

The provision of a facultative, improved sealing system with less air leakage (e.g. a brush-type seal as disclosed in the initially cited Specification EP 0 757 750 B1) will enhance the efficiency of the second or secondary pre-swirl system, among others by the pump mass flow drawn by the rotating rotor disk. Advantageously, the mass of a brush-type sealing system is lower than that of a conventional labyrinth-type seal.

BRIEF SUMMARY OF THE INVENTION

Further objects and advantages of this invention will become apparent from the following detailed description of a preferred embodiment which is shown in partial and principal representation only. A cooling air ducting system according to the present invention is shown schematically in the one accompanying FIGURE, in which all of the features described in detail can be essential for the invention.

BRIEF DESCRIPTION OF THE DRAWING

Reference numeral 1 indicates the first stage rotor disk of the high-pressure turbine section of a gas turbine engine not further detailed herein, with the outer circumference of the rotor disk carrying, as usual, a number of rotor blades 2 (shown only partly herein) which extend into working gas-carrying main gas path 3 of the engine. As usual, stationary stator vanes 5 are arranged upstream of the rotor blades 2, these rotor blades 2 rotating with the rotor disk 1 about a rotational axis 4 represented in the lower part of FIGURE, i.e. the working gas flows the gas path essentially in the direction of the arrow A. While the direction of arrow A corresponds to the axial direction of the engine and is accordingly also designated with A in the following, the radial direction R is vertical to the direction A and extends from the rotational axis 4 of the engine, which is centrally inward and parallel to axial direction A, to the outside.

As usual, a combustion chamber (not shown) and a compressor section of the engine are arranged in this sequence upstream of the high-pressure turbine section which is only partly represented. Accordingly, when viewed against the axial direction A, the combustion chamber and the compressor section follow in this sequence to the left of the engine section shown in the FIGURE. As is known, the air flow discharged from the compressor does not entirely enter the engine combustion chamber, to be energetically enriched therein by the combustion of fuel, but partly passes by the combustion chamber, this bypassed portion not being further heated up and, therefore, being available as sealing air for the turbine interior and as cooling air for those components requiring cooling in the turbine section.

In particular the rotor blades 2 and the first stage rotor disk 1 carrying these rotor blades require intensive cooling by a relative cold air flow which, throughout the FIGURE, is indicated by the arrows 6, with the reference numeral 6 being accordingly used in the following to make reference to this air flow which, as already explained, bypasses the combustion chamber, and to portions of this airflow. As usual, this air flow 6 is applied to the face 1a of the rotor disk 1, i.e. at least a portion of this air flow 6 enters a pre-swirl chamber 7 arranged upstream of the rotor disk 1 which is separated from the engine interior 8 by a diaphragm 9, with this engine interior 8 again being arranged upstream when viewed in the axial direction A. From this pre-swirl chamber 7, the cooling air flow 6 is fed through cooling air ducts 14 in the rotor disk 1 to the interiors of the partly hollow, air-cooled rotor blades 2, as illustrated in highly simplified form. This cooling air, which is already heated, is then routed through film cooling holes (not shown) in the surfaces of the rotor blades 2 to the main gas path 3.

DETAILED DESCRIPTION OF THE INVENTION

Referring to the cooling air ducting arrangement in the high-pressure turbine section of the engine, portions of the air flow 6 which bypasses the combustion chamber are introduced both to the engine interior 8 and to the annulus 10 arranged radially (R) outside of the engine interior 8. More precisely, cooling air is introduced to the annulus 10 from the outer side of the engine by crossing over the main gas path 3, i.e. through the air-cooled vanes 5, with that portion of the air flow 6 getting into the engine interior 8 which virtually bypasses the usually annular combustion chamber as it flows through its central zone.

The air flow 6 which is introduced to, or is present in, the annulus 10 and in the engine interior 8 has only a weak swirl. However, it is desirable that the swirl of the air flow 6 in the pre-swirl chamber 7 is strong, i.e that it virtually rotates together with the rotor disk 1 about the rotational axis 4. Therefore, the air flow 6 is introduced to the pre-swirl chamber 7 via pre-swirl systems 11a, 11b. As the air flow 6 passes these pre-swirl systems 11a, 11b, it is given a swirl which is co-directional with the direction of rotation of the rotor disk 1.

Various designs of such pre-swirl systems are known to the expert. For example, provision can be made for a cascade of suitably designed vanes which is annular in relation to the rotational axis 4. In an alternative design which is preferred in the present embodiment but is not explicitly illustrated for simplicity reasons, the pre-swirl systems 11a, 11b are formed by holes, or generally passages, provided in the diaphragm 9 in annular arrangement relative to the rotational axis 4, with the axes of these holes or passages not being parallel to the axial direction A, but being more or less inclined or set in the circumferential direction (which is normal to the drawing plane). By way of this arrangement, the desired swirl is safely and simply imparted on the air flow 6 as it passes through these holes or passages to the pre-swirl chamber 7.

The essential feature is the arrangement of two pre-swirl systems 11a, 11b which both connect to the pre-swirl chamber 7. While the first pre-swirl system 11a, which is arranged further outward in the radial direction R, is supplied with a portion of the air flow 6 which bypasses the combustion chamber, the second (secondary) pre-swirl system 11b, which is arranged further inward in the radial direction R, is furnished with the air flow 6 from the engine interior 8. Accordingly, the arrangement of two pre-swirl systems 11a, 11b provides that an air flow 6, after having been sufficiently cooled in the first pre-swirl system 11a, is applied to the area of the rotor disk 1 which is further outward in the radial direction R and that a further air flow 6, after having been aerodynamically deflected and thereby cooled in the second pre-swirl system 11b, is applied to the area of the rotor disk 1 which is further inward in the radial direction R.

The efficiency of the second, or secondary, pre-swirl system 11b is enhanced by the provision of a type of sealing system 13 between a section 9a of the diaphragm 9 confining the pre-swirl chamber 7 and a turbine shaft section 12 adjacent to this section 9a which is less permissive to leaking air than the labyrinth-type seals normally used in this application. As illustrated, the rotor disk 1 is attached to said turbine shaft section 12 by means of an annular arm 1b protruding from its face 1a, so that the pre-swirl chamber 7 upstream of the rotor disk 1 virtually makes a bow towards the point at which the section 9a of the stationary diaphragm 9 is very close to the turbine shaft or a section 12 of the turbine shaft, respectively. As usual, a sealing system 13 is provided in this area which seals the pre-swirl chamber 7 at least partly against the engine interior 8.

Normally, this sealing system 13 is provided as a labyrinth-type seal which, while producing virtually no frictional loss, is known to suffer from relatively high leakage, i.e. has a relatively low sealing efficiency. According to the present invention, a sealing system 13 is provided in this area which is less tolerant to or permissive of leaking air, this sealing system 13 being of the commonly known brush-type in a preferred embodiment. Owing to the relatively high sealing efficiency of such a sealing system 13, an extremely small amount of air will leak from the engine interior 8 to the pre-swirl chamber 7 past the respective sealing gap between the turbine-shaft section 12 and the diaphragm section 9a. Consequently, the air flow 6 from the engine interior 8 will, as desired, be fed to the pre-swirl chamber 7 essentially via the second pre-swirl system 11b, with the pumping effect of the rotating rotor disk 1 being an essential factor.

The aforesaid cooling air ducting system in the high-pressure turbine section of a gas turbine engine provides for a reduction of the surface temperatures of the rotor disk 1 in the central and the radially inward area of the pre-swirl chamber 7 of about 50° as compared to the state of the art. Beneficial to the rotor disk 1 are the lower radial temperature gradients resulting from this reduction on its face 1a. Also, with the substitution of the labyrinth-type sealing system 13, the mass of the rotor disk 1 is advantageously reduced. Furthermore, the similarity of the swirl of the two air flows 6 supplied to the pre-swirl chamber 7 via the two pre-swirl systems 11a, 11b results in a reduction of the dilution losses, with the temperature level of the cooling air used for the cooling of the rotor blades 2 or supplied to the rotor blades 2 via the cooling ducts 14, respectively, being lowered as well. It is apparent that a plurality of details, especially of design, other than those described herein may be incorporated in the present embodiment without departing from the inventive concept.

What is claimed is:

1. A cooling air ducting system of a high-pressure turbine section of a gas turbine engine in which a portion of an air flow which exits from a compressor section of the engine bypasses a combustion chamber of the gas turbine, comprising:

a pre-swirl chamber positioned upstream of a first stage turbine rotor disk;

a diaphragm separating the pre-swirl chamber from an interior of the engine;

a first pre-swirl system provided in the diaphragm for ducting a portion of the bypass air flow into the pre-swirl chamber to air-cooled blades carried by the first stage turbine rotor disk to cool the blades; and a second pre-swirl system positioned in the diaphragm radially inwardly from the first pre-swirl system for ducting a further portion of the bypass air flow into the pre-swirl chamber to a radially inwardly portion of a face of the first stage turbine rotor disk.

2. A cooling air ducting system as in claim 1, further comprising:

a sealing system provided between a section of the diaphragm confining the pre-swirl chamber and an adjacent turbine shaft section.

3. A cooling air ducting system as in claim 2, wherein the sealing system comprises a brush-type seal.

4. A cooling air ducting system as in claim 3, wherein air ducted into the pre-swirl chamber from the first pre-swirl system is fed from the pre-swirl chamber through cooling air ducts in the rotor disk to partly hollow interiors of the air-cooled blades to cool the blades.

5. A cooling air ducting system as in claim 1, wherein air ducted into the pre-swirl chamber from the first pre-swirl system is fed from the pre-swirl chamber through cooling air ducts in the rotor disk to partly hollow interiors of the air-cooled blades to cool the blades.

* * * * *